United States Patent
Hao

(10) Patent No.: US 12,533,907 B2
(45) Date of Patent: Jan. 27, 2026

(54) UNIVERSAL WHEEL

(71) Applicant: Chengdu NUWA Robotics Corp Xiamen Branch, Xiamen (CN)

(72) Inventor: Xiguo Hao, Xiamen (CN)

(73) Assignee: Chengdu NUWA Robotics Corp Xiamen Branch, Xiamen (CN)

( * ) Notice: Subject to any disclaimer, the term of this patent is extended or adjusted under 35 U.S.C. 154(b) by 0 days.

(21) Appl. No.: 18/666,278

(22) Filed: May 16, 2024

(65) Prior Publication Data

US 2024/0408914 A1     Dec. 12, 2024

(30) Foreign Application Priority Data

Jun. 6, 2023  (CN) .......................... 202310662691.0

(51) Int. Cl.
*B60B 33/00* (2006.01)
*B60B 33/04* (2006.01)

(52) U.S. Cl.
CPC ........ *B60B 33/045* (2013.01); *B60B 33/0049* (2013.01); *B60B 33/0057* (2013.01); *B60B 2900/131* (2013.01); *B60B 2900/551* (2013.01)

(58) Field of Classification Search
CPC ............ E05D 15/0652; E05D 15/0643; E05D 15/0621; E05D 15/0686; E05D 15/0647; B60J 5/062; B60J 5/065; B60J 5/08; B61D 19/005; B61D 19/007; B61D 19/02; E05Y 2800/683; E05Y 2201/684; E05Y 2800/27; E05Y 2800/676; E05Y 2900/506; E05Y 2900/51; E05Y 2900/516; E05Y 2900/518; E05Y 2900/50

See application file for complete search history.

(56) References Cited

U.S. PATENT DOCUMENTS

| | | | | |
|---|---|---|---|---|
| 2,738,542 A | * | 3/1956 | Clark, Jr. ............. | B60B 33/045 280/124.13 |
| 2,885,720 A | * | 5/1959 | Seeberger ............ | B60B 33/021 16/35 R |
| 3,102,298 A | * | 9/1963 | Sheahan ............... | B60B 33/021 267/134 |
| 3,518,714 A | * | 7/1970 | Hager ..................... | B62B 5/00 16/35 R |
| 6,357,077 B1 | * | 3/2002 | Jones, Jr. ............. | B60B 33/045 16/35 D |

(Continued)

FOREIGN PATENT DOCUMENTS

| | | | | |
|---|---|---|---|---|
| JP | 2012101650 A | * | 5/2012 | |
| JP | 2018131192 A | * | 8/2018 | ........... B60B 33/045 |

*Primary Examiner* — Chuck Y Mah
(74) *Attorney, Agent, or Firm* — JEEN IP LAW, LLC

(57) ABSTRACT

The invention discloses a universal wheel including a support base, the support base including a top portion connected with a steering assembly that enables 360° rotation of the universal wheel, and a rolling assembly, the rolling assembly including an axle and a roller rotatably connected to the axle. A coordinate system is constructed with a center of the roller as an origin, a traveling direction of the roller as a negative direction of an abscissa, and a direction perpendicular to the abscissa and extending upward as a positive direction of an ordinate, the support base has a chute located in a first quadrant, and the axle is slidably connected to the chute along a radial direction of the roller. This apparatus has good shock absorbing performance and a strong obstacle-crossing ability.

6 Claims, 5 Drawing Sheets

(56) References Cited

U.S. PATENT DOCUMENTS

| | | | | |
|---|---|---|---|---|
| 6,484,359 | B1* | 11/2002 | Guttmann | G01G 3/02 16/35 R |
| 7,648,150 | B2* | 1/2010 | Chen | B62B 9/18 280/124.179 |
| 8,607,414 | B1* | 12/2013 | Kinsela | B60B 33/045 16/35 D |
| 9,636,948 | B2* | 5/2017 | Hillaert | A45C 5/14 |
| 10,772,775 | B2* | 9/2020 | Delmatoff | B60B 33/045 |
| 2007/0143957 | A1* | 6/2007 | Baek | B60B 33/045 16/44 |

\* cited by examiner

UNIVERSAL WHEEL

CROSS-REFERENCE TO RELATED APPLICATIONS

This application claims priority to Chinese Patent Application No. 202310662691.0, filed on Jun. 6, 2023, which is hereby incorporated by reference in its entirety.

TECHNICAL FIELD

The present invention relates to the field of wheels, and in particular to a universal wheel.

BACKGROUND

In the related art, universal wheels can only rotate 360 degrees horizontally, and since a rotating structure of fixed casters cannot move in a vertical direction and includes no obstacle-crossing mechanism, the universal wheels in the related art cannot successfully go over a high obstacle. Even when the universal wheels can go over the obstacle, the universal wheels shake violently and produce a noise during the going-over, resulting in a poor user experience. There is also a universal wheel that can move in the vertical direction, but an angle between an interaction force between the universal wheel and the obstacle and a force on the universal wheel itself in the vertical direction is large, and thus it is difficult to lift the universal wheel vertically.

SUMMARY

In view of this, it is necessary to provide a universal wheel having good shock absorbing performance and a strong obstacle-crossing ability.

In order to solve the above technical problems, the technical solution of the present invention is a universal wheel including:
- a support base, the support including a top portion connected with a steering assembly that enables 360° rotation of the universal wheel;
- a rolling assembly, the rolling assembly including an axle and a roller rotatably connected to the axle, a coordinate system being constructed with a center of the roller as an origin, a traveling direction of the roller as a negative direction of an abscissa, and a direction perpendicular to the abscissa and extending upward as a positive direction of an ordinate, the support base having a chute located in a first quadrant, and the axle being slidably connected to the chute along a radial direction of the roller; and
- a shock-absorbing assembly, the shock-absorbing assembly including a damped stretchable element having a lower end connected to the axle and an upper end connected to the support base, a component force of a force applied by the stretchable element on the axle, which is applied to the axle along a moving direction of the axle, being defined as a first component force, a component force of a maximum bearable load force of the axle, which is applied to the axle along the moving direction of the axle, being defined as a second component force, and the first component force being greater than the second component force to force the axle to always be located at a bottom end of the chute without an external force.

Further, a direction of the force is parallel to the moving direction of the axle.

Further, the stretchable element is a spring, a gas spring or a hydraulic rod.

Further, the support base includes a fixed plate connected to an upper end of the stretchable element.

Further, when the stretchable element is a spring, the fixed plate has a through hole in which a support rod is slidably connected, a lower end of the support rod is fixedly connected to the axle, and the spring is fitted onto the support rod and located between the axle and the fixed plate.

Further, an upper end of the support rod includes a nut that prevents the support rod from being separated from the through hole.

Further, the fixed plate is perpendicular to the support rod.

Further, the chute is an oblong hole, and a center of a bottom portion of the chute is the origin of the coordinate system.

Further, the support base includes two wing plates, each of the wing plates is provided with a chute, and two ends of the axle are slidably connected to the chutes, respectively.

Compared with the related art, the present invention has the following beneficial effects. By coordinating a spring and a chute disposed obliquely along a radial direction of a roller, this apparatus reduces an angle between resistance applied by an obstacle on the roller and a reaction force generated by the spring when the universal wheel encounters the obstacle, thereby effectively reducing the resistance that the roller bears and improving an obstacle-crossing ability and a shock absorbing effect of the roller.

In order to make the above and other objects, features and advantages of the present invention more clearly understood, preferred embodiments are described in detail below in conjunction with the accompanying drawings.

DESCRIPTION OF EMBODIMENTS

In order to further explain the technical means and effects adopted by the present invention to achieve the intended purpose of the invention, the specific embodiments, structure, characteristics and effects of the present invention will be described in detail below in conjunction with the accompanying drawings and preferred embodiments.

Figure 1:
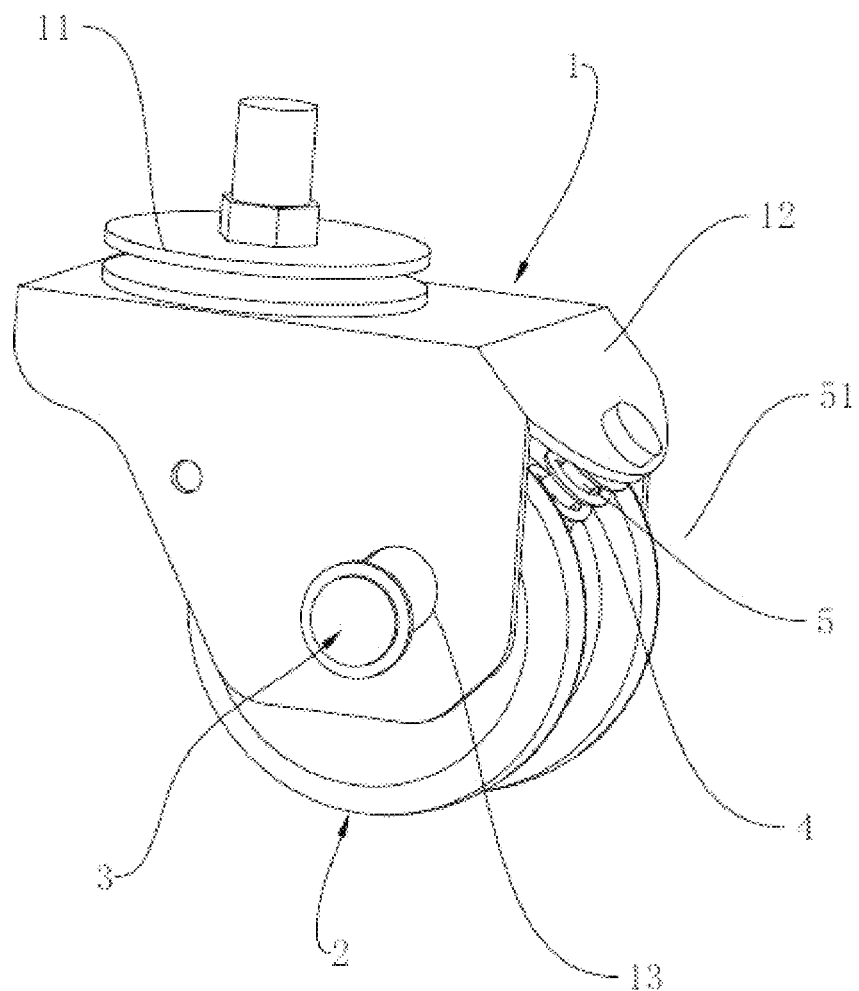
FIG. 1 is a perspective view of an embodiment of the present invention.

As shown in FIG. 1, a universal wheel includes a support base 1, a rolling assembly, and a shock-absorbing assembly.

A top portion of the support base 1 is fixedly connected with a steering assembly 11 that enables 360° rotation of the universal wheel. The steering assembly 11 is a general assembly of the universal wheel, and a structure thereof is a well-known technology and will not be described in detail in this application.

The rolling assembly includes an axle 3 and a roller 2 rotatably connected to the axle 3.

The shock-absorbing assembly includes a damped stretchable element having a lower end connected to the axle 3 and an upper end connected to the support base 1.

Figure 2:
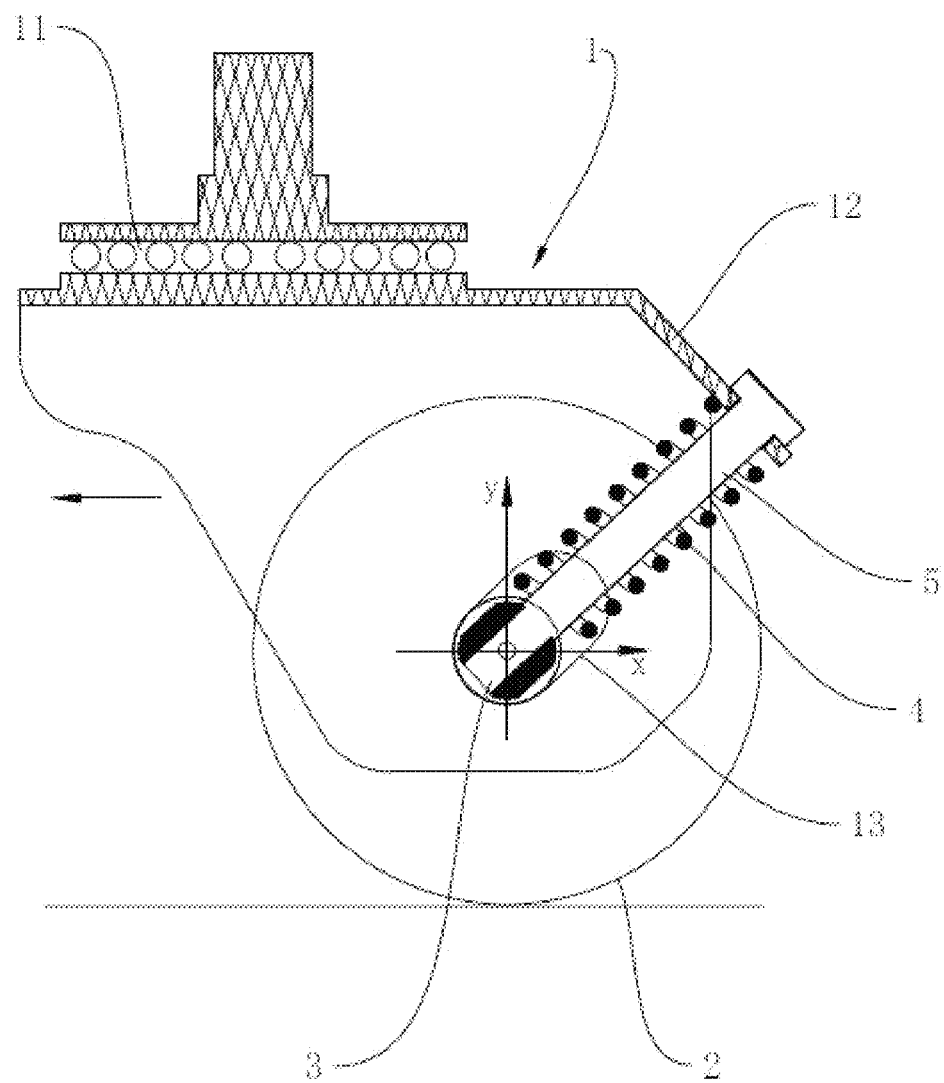
FIG. 2 is a cross-sectional view of the embodiment of the present invention.

As shown in FIG. 2, a coordinate system is constructed with a center of the roller 2 as an origin, a traveling direction of the roller 2 as a negative direction of an abscissa, and a direction perpendicular to the abscissa and extending upward as a positive direction of an ordinate. The coordinate system divides the roller 2 into four quadrants. An arrow which does not constitute the coordinate system in FIG. 2 means a traveling direction of the universal wheel.

The support base 1 includes two wing plates, and each of the wing plates is provided with a chute 13. The chute 13 is located in a first quadrant. Both ends of the axle 3 are slidingly connected to the chutes 13 along a radial direction of the roller. The chute 13 is an oblong hole, and a center of a bottom portion of the chute 13 is the origin of the coordinate system. A major axis of the chute 13 is not parallel to an abscissa line and an ordinate line.

The support base 1 includes a fixed plate 12 connected to an upper end of the stretchable element.

In the present embodiment, the stretchable element is a spring, a gas spring, or a hydraulic rod. In practical applications, the spring have the highest cost performance, so the present embodiment uses a spring 4 as an example. In order to ensure stability of compression and expansion of the spring 4 during a stress process, the fixed plate 12 has a through hole in which a support rod 5 is slidably connected, a lower end of the support rod 5 is fixedly connected to the axle 3, and the spring 4 is fitted on the support rod 5 and located between the axle 3 and the fixed plate 12. An upper end of the support rod 5 includes a nut 51 that prevents the support rod from being separated from the through hole.

In order to maximize the shock absorbing effect and the obstacle-crossing ability, an axis of the spring 4 is parallel to a moving direction of the axle 3. Therefore, the fixed plate 12 is perpendicular to the support rod 5. Of course, a force applying direction of the stretchable element on the axle may not be along the moving direction of the axle, but this will increase a force on the spring, which is not conducive to the shock absorption. Therefore, the axis of the spring is preferably parallel to the moving direction of the axle.

A component force of a force applied by the stretchable element on the axle, which is applied to the axle along the moving direction of the axle, is defined as a first component force, a component force of a maximum bearable load force of the axle, which is applied to the axle along the moving direction of the axle, is defined as a second component force, and the first component force is greater than the second component force to force the axle to always be located at a bottom end of the chute without an external force. When the axis of the spring is parallel to the moving direction of the axle, the first component force is the force.

In universal wheels in the related art, since a roller is in a direction perpendicular to the ground, regardless of whether the universal wheel has a lifting function, a forced direction thereof is perpendicular to the ground. When the roller encounters an obstacle, an angle between resistance applied by the obstacle on the roller and a force on the roller in the direction perpendicular to the ground are relatively large, so the user is required to use a larger thrust to make the roller go over the obstacle, resulting in greater shock of the universal wheel and poor user experience.

Of course, the obstacle of the universal wheel means an obstacle of which a height does not exceed a radius of a roller of the universal wheel.

Figure 3:
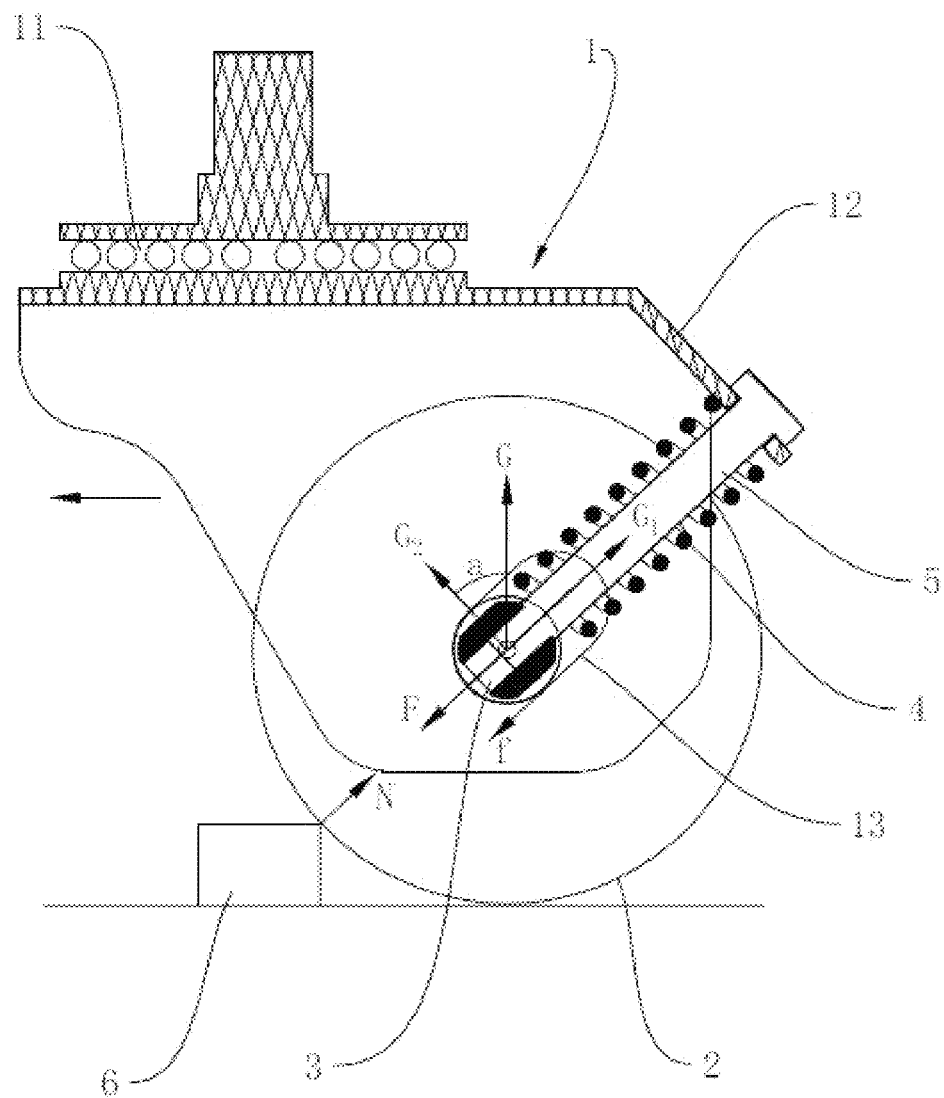
FIG. 3 is a force analysis diagram when encountering an obstacle 1 in the embodiment of the present invention.

FIG. 3 is a force analysis diagram when the universal wheel contacts a medium obstacle. Resistance of the medium obstacle to the roller is exactly parallel to or coincident with the moving direction of the axle. Assume that an angle between a maximum bearable load force of the roller G and G2 is 42°, a friction coefficient between the axle and the chute is 0.15, and the maximum bearable load force of the roller G is 20 Kg, relationships are as follows:

$$G1=\sin 42°\times G=13.4 \text{ Kg}, f=u\times G2=0.15\times \cos 42°\times G=2.2 \text{ Kg}, F>G1-f=11.2 \text{ Kg}$$

A thrust N applied by the medium obstacle in the moving direction of the axle along the radial direction of the roller is exactly the same as a direction of G1, and a force applied by the spring on the axle is opposite to a direction of N. When the universal wheel is pushed, the resistance N pushes up and compresses the spring, and the axle slides up along the chute, whereby a shock caused by the universal wheel going over the medium obstacle is greatly weakened, the axle drives the roller to rise, and the obstacle-crossing ability of the roller is greatly improved.

Figure 4:
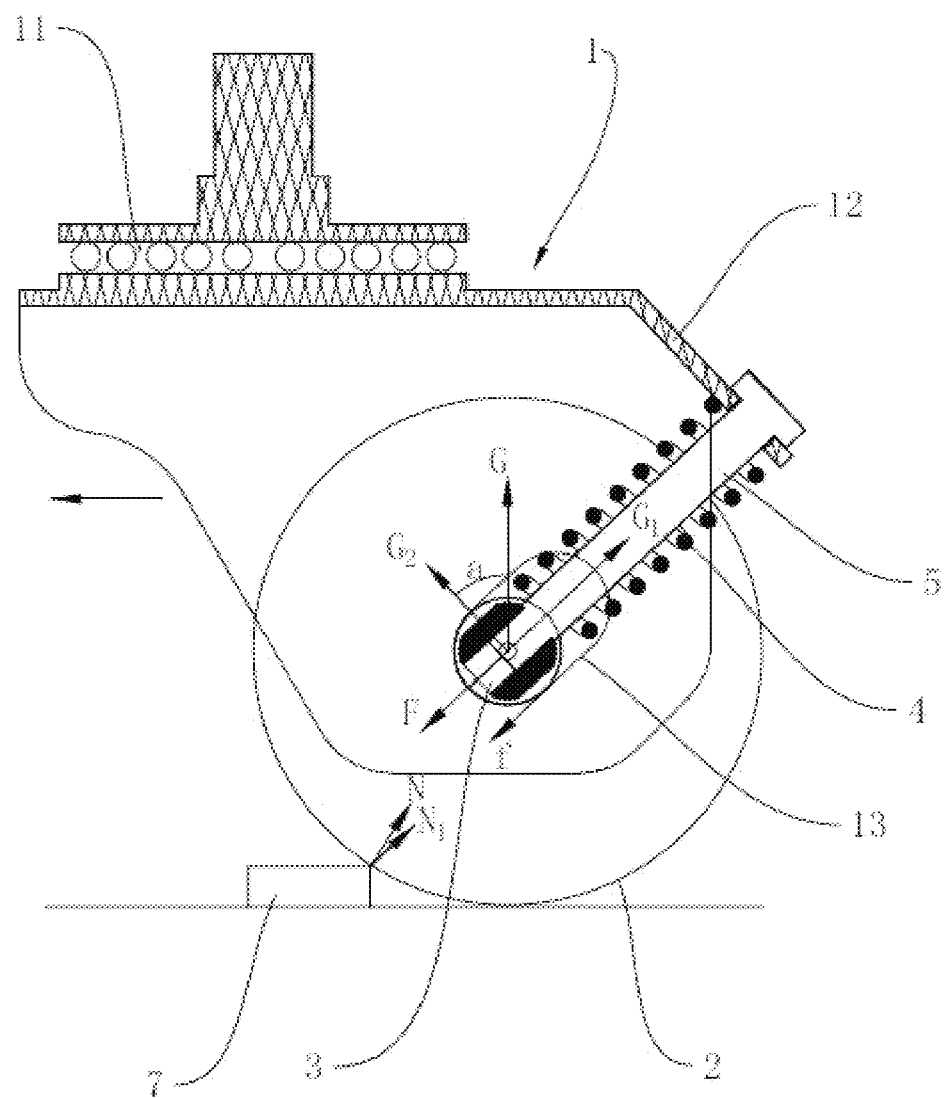
FIG. 4 is a force analysis diagram when encountering an obstacle 2 in the embodiment of the present invention.

FIG. 4 is a force analysis diagram when the universal wheel contacts a small obstacle. Resistance of the small obstacle to the roller is below an extension line of the moving direction of the axle. Assume that an angle between the maximum bearable load force of the roller G and G2 is 42°, a friction coefficient between the axle and the chute is 0.15, and the maximum bearable load force of the roller G is 20 Kg, relationships are as follows:

$$G1=\sin 42°\times G=13.4 \text{ Kg}, f=u\times G2=0.15\times \cos 42°\times G=2.2 \text{ Kg}, F>G1-f=11.2 \text{ Kg}$$

A thrust N1 applied by the small obstacle in the moving direction of the axle is obviously smaller than N, that is, when the universal wheel is pushed, the user can push the universal wheel with a less force, deformation of the spring is smaller, the resistance N1 pushes up and compresses the spring, and the axle slides up along the chute, whereby a shock caused by the universal wheel going over the small obstacle is greatly weakened, the axle drives the roller to rise, and the obstacle-crossing ability of the roller is greatly improved.

Figure 5:
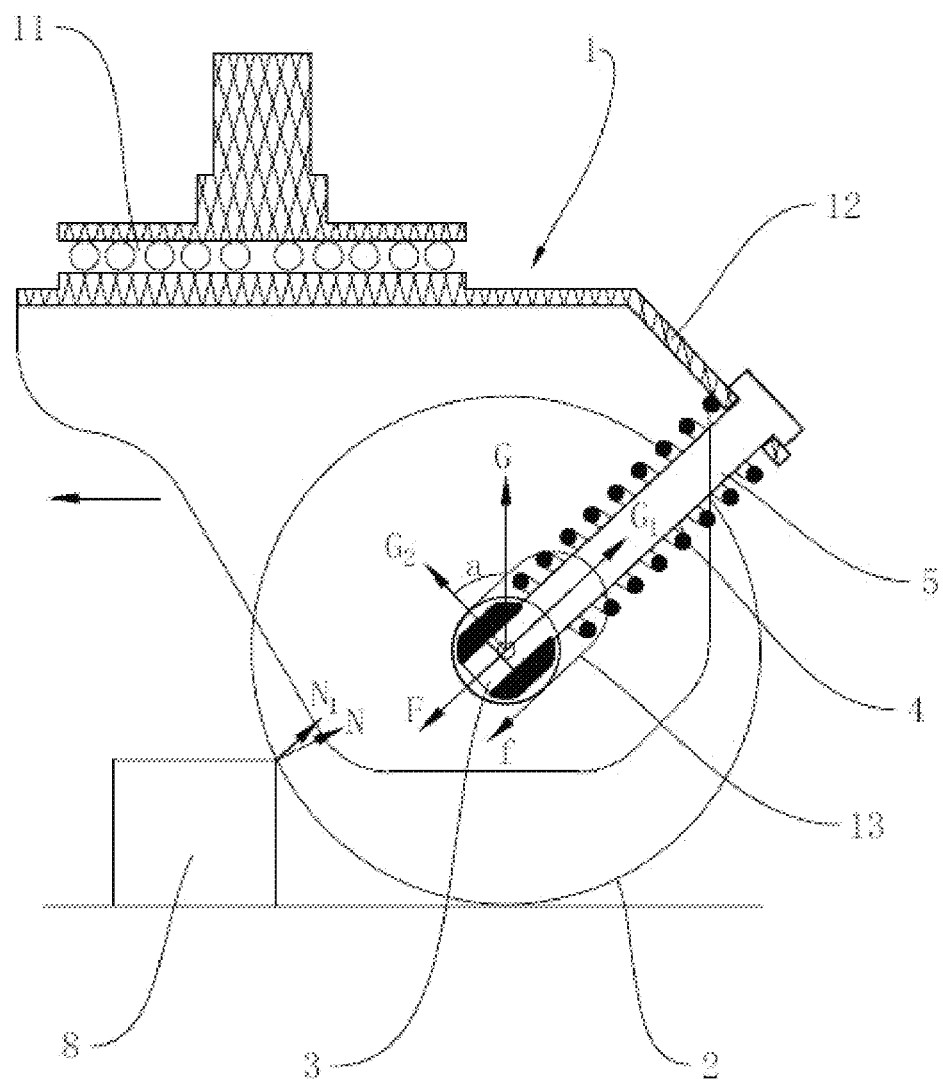
FIG. 5 is a force analysis diagram when encountering an obstacle 3 in the embodiment of the present invention.

FIG. 5 is a force analysis diagram when the universal wheel contacts a large obstacle. Resistance of the large obstacle to the roller is above an extension line of the moving direction of the axle, but below a horizontal diameter line of the roller. Assume that an angle between the maximum bearable load force of the roller G and G2 is 42°, a friction coefficient between the axle and the chute is 0.15, and the maximum bearable load force of the roller G is 20 Kg, relationships are as follows:

$$G1=\sin 42°\times G=13.4 \text{ Kg}, f=u\times G2=0.15\times \cos 42°\times G=2.2 \text{ Kg}, F>G1-f=11.2 \text{ Kg}$$

The thrust N1 applied by the large obstacle in the moving direction of the axle is obviously greater than N. Compared with FIG. 3, when the universal wheel is pushed, the user is required to apply a greater thrust to push the universal wheel, deformation of the spring is greater, the resistance N1 pushes up and compresses the spring, and the axle slides up along the chute, whereby a shock caused by the universal wheel going over the large obstacle is greatly weakened, the axle drives the roller to rise, and the obstacle-crossing ability of the roller is greatly improved.

The above descriptions are only the preferred embodiments of the present invention, and do not limit the present invention in any form. Although the present invention has been disclosed in the preferred embodiments as above, the preferred embodiments are not used for limiting the present invention, any skilled person familiar with this art can make some changes or modifications by using the technical contents disclosed above to serve as equivalent embodiments of equivalent changes, without departing from the scope of the technical solutions of the present invention, and any simple modifications, equivalent changes and modifications made to the above embodiments according to the technical essence of the present invention, without departing from the contents of the technical solutions of the present invention, still fall within the scope of the technical solutions of the present invention.

REFERENCE SIGNS LIST 1 support base
11 steering assembly
12 fixed plate
13 chute
2 roller
3 axle
4 spring
5 support rod
51 nut
6 medium obstacle
7 small obstacle
8 large obstacle
G maximum bearable load force of roller
G1 second component force
G2 pressure of axle on side wall of chute
f friction force received by axle
F force of spring on axle
N resistance applied by obstacle on roller along radial direction of roller
N1-N component force of resistance applied on roller along moving direction of axle

What is claimed is:

1. A universal wheel, comprising:
a support base, the support base including a top portion connected with a steering assembly that enables 360° rotation of the universal wheel;
a rolling assembly, the rolling assembly including an axle and a roller rotatably connected to the axle, a coordinate system being constructed with a center of the roller as an origin, a traveling direction of the roller as a negative direction of an abscissa, and a direction perpendicular to the abscissa and extending upward as a positive direction of an ordinate, the support base having a chute located in a first quadrant, and the axle being slidably connected to the chute along a radial direction of the roller; and
a shock-absorbing assembly, the shock-absorbing assembly including a damped stretchable element having a lower end connected to the axle and an upper end connected to the support base, a component force of a force applied by the stretchable element on the axle, which is applied to the axle along a moving direction of the axle, being defined as a first component force, a component force of a maximum bearable load force of the axle, which is applied to the axle along the moving direction of the axle, being defined as a second component force, and the first component force being greater than the second component force to force the axle to always be located at a bottom end of the chute without an external force;
wherein the stretchable element is a spring, a gas spring or a hydraulic rod;
wherein the support base includes a fixed plate connected to an upper end of the stretchable element;
wherein when the stretchable element is a spring, the fixed plate has a through hole in which a support rod is slidably connected, a lower end of the support rod is fixedly connected to the axle, and the spring is fitted onto the support rod and located between the axle and the fixed plate.

2. The universal wheel according to claim 1, wherein a direction of the force is parallel to the moving direction of the axle.

3. The universal wheel according to claim 1, wherein an upper end of the support rod includes a nut that prevents the support rod from being separated from the through hole.

4. The universal wheel according to claim 1, wherein the fixed plate is perpendicular to the support rod.

5. The universal wheel according to claim 1, wherein the chute is an oblong hole, and a center of a bottom portion of the chute is the origin of the coordinate system.

6. The universal wheel according to claim 1, wherein the support base includes two wing plates, each of the wing plates is provided with a chute, and two ends of the axle are slidably connected to the chutes, respectively.

* * * * *